(12) United States Patent
Kiveris

(10) Patent No.: US 8,762,496 B1
(45) Date of Patent: Jun. 24, 2014

(54) PRE-SELECTING CONTENT TO BE DELIVERED TO A USER

(75) Inventor: Raimondas Kiveris, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 13/186,162

(22) Filed: Jul. 19, 2011

(51) Int. Cl.
*G06F 15/16* (2006.01)

(52) U.S. Cl.
USPC .................... 709/219; 709/203; 709/217

(58) Field of Classification Search
USPC .................. 709/202–203, 217–219
See application file for complete search history.

(56) References Cited

U.S. PATENT DOCUMENTS

| 6,769,019 B2 * | 7/2004 | Ferguson | 709/219 |
| 7,064,853 B2 * | 6/2006 | Simpson et al. | 709/217 |
| 7,945,573 B1 * | 5/2011 | Barnes et al. | 707/756 |
| 2002/0120721 A1 * | 8/2002 | Eilers et al. | 709/203 |
| 2010/0325709 A1 * | 12/2010 | Kawase | 709/217 |
| 2011/0236872 A1 * | 9/2011 | Taylor | 709/219 |
| 2012/0005041 A1 * | 1/2012 | Mehta et al. | 709/203 |

* cited by examiner

*Primary Examiner* — Bharat N Barot
(74) *Attorney, Agent, or Firm* — Fish & Richardson P.C.

(57) ABSTRACT

Methods, systems, and computer program products, including computer programs encoded on a computer readable storage medium, for pre-selecting content to be delivered to a user. A method includes: pre-selecting one or more content items for delivery to a user based at least in part on a user identifier, the user identifier identifying the user as being associated with a targeting group; storing the pre-selected content items in a list in association with the user; receiving a request for content, the request including the identifier; identifying one or more of the pre-selected content items eligible for delivery to the user based on the identifier; determining, based at least in part on evaluation criteria, that one of the pre-selected content items should be provided to the user responsive to the request; and providing, by a server system and responsive to the request, the determined content item to a client device.

15 Claims, 7 Drawing Sheets

PRE-SELECTING CONTENT TO BE DELIVERED TO A USER

BACKGROUND

This specification relates to the selection and display of content.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this disclosure can be implemented in methods that include a method for providing a pre-selected content item to a user. The method comprises: pre-selecting, by a server system, one or more content items for delivery to a user based at least in part on a user identifier, the user identifier identifying the user as being associated with a targeting group; storing the pre-selected content items in a list in a server system in association with the user; receiving, at the server system, from a client device, a request for content, the request including the identifier; identifying, in the server system, one or more of the pre-selected content items eligible for delivery to the user based on the identifier; determining, in the server system, based at least in part on evaluation criteria, that one of the pre-selected content items should be provided to the user responsive to the request; and providing, by the server system and responsive to the request, the determined content item to the client device.

In general, another aspect of the subject matter described in this disclosure can be implemented in methods that include a method for pre-selecting content to be delivered to a user. The method includes: identifying a targeting group, the targeting group defining a set of characteristics for a target delivery of an impression; determining one or more available content items from inventory that at least partially match the set of characteristics associated with the targeting group; ranking the determined content items; and storing the ranked content items in association with the targeting group forming a list of eligible pre-selected content items for the targeting group, such that when a request is received that identifies the targeting group, one or more of the pre-selected content items can be automatically delivered responsive to the request without having to evaluate the inventory.

In general, another aspect of the subject matter described in this disclosure can be implemented in methods that include a method for pre-selecting content to be delivered to a user. The method includes: identifying a user, the user including a profile that describes features associated with the user that can be targeted to by content providers; determining one or more available content items from inventory that have characteristics that at least partially match the features associated with the user; ranking the determined content items; and storing the ranked content items in association with the user forming a list of eligible pre-selected content items for the user, such that when a subsequent request is received that identifies the user, one or more of the pre-selected content items can be automatically delivered responsive to the request without having to evaluate available inventory.

In general, another innovative aspect of the subject matter described in this disclosure can be implemented in methods that include a method for providing a pre-selected content item to a user. The method comprises: pre-selecting one or more content items for delivery to a user based at least in part on a user profile; storing, at a server, the pre-selected content items in a list in association with the user; after the storing, receiving a request for content, the request for content identifying the user; identifying the pre-selected content items associated with the user, responsive to the received request; and providing at least one of the pre-selected content items responsive to the request based at least in part on the evaluating.

In general, another aspect of the subject matter described in this disclosure can be implemented in systems that include a system for pre-selecting content to be delivered to a user. The system includes an identification engine that identifies one or more pre-selected content items eligible for delivery to a user based on a user identifier. The system includes a storage medium that stores a list of the identified pre-selected content items associated with the user. The system includes an evaluation engine that is configured to determine, based at least in part on an evaluation criteria, a pre-selected content item to be served in response to a request received from the user and after the storage of the list. The system includes a content management system that receives a request for content including the user identifier identifying the user as being of or associated with a targeting group and provides a content item from the list determined by the evaluation engine in response to the request.

In general, another aspect of the subject matter described in this specification can be implemented in computer program products that include a computer program product embodied in a tangible medium that when executed by a processor causes the processor to perform operations. The operations include: receiving a request for content, the request including an identifier identifying the user as being of or associated with a targeting group; identifying one or more pre-selected content items eligible for delivery to the user based on the identifier, the pre-selected content items being pre-selected for delivery to users that are associated with the targeting group, the list being created prior to receipt of the received request; determining, based at least in part on an evaluation criteria, that one of the pre-selected content items should be served responsive to the request; and providing the determined content item responsive to the request.

These and other implementations can each optionally include one or more of the following features. Receiving the request for content can include receiving a request for content to be published on a publisher property. The request can be associated with a slot that is not targeted based on context. The request can be a request that is not responsive to a search. The one or more pre-selected content items can be content items that are in an inventory of content items that are available for serving to users. The pre-selected content items can be content items that at least partially match characteristics of the targeting group. For items that are pre-selected and that only partially match the characteristics of the targeting group, the determining can include determining, after the request is received, whether a given partially matching pre-selected content item matches the characteristics of the targeting group. Each content item can include one or more targeting aspects that are to be satisfied before serving a respective content item, and the one or more pre-selected content items can be content items that at least partially match the characteristics of the targeting group. The evaluation criteria can include criteria based on a measure of urgency in needing to deliver a respective content item. The evaluation criteria can include criteria based on a measure of how much ahead or behind a respective content item is in terms of a delivery schedule. Prior to receiving the request, a targeting group and targeting characteristics of the targeting group can be identified, one or more available content items can be determined from inventory that at least partially match the targeting characteristics of the targeting group, the determined content items can be ranked, and the ranked content items can be stored in association with the targeting group, such that when a request is received that identifies the targeting group, one or more of the stored ranked content items can be delivered responsive to the request. The targeting group can be associated with an identifier. The targeting group can be associated with a user list. Requests received that identify the targeting group by way of an identifier or a user list can be automatically served one or more of the pre-selected content items. The user can be associated with an identifier. The user can be associated with a user list. Requests received that identify the user by way of an identifier or a user list can be automatically served one or more of the pre-selected content items.

Particular implementations may realize one or more of the following advantages. Providing a pre-selected content item to the user can decrease content request servicing time as compared to determining which content item to provide to a user at the time of the content request. A content management system can use less memory because complex content targeting criteria and expressions do not need to be stored or evaluated at content serving time if content items are pre-selected. One or more pre-selected content items can be automatically served to a user in response to a received content request that identifies a targeting group or the user by way of an identifier or a user list. One or more pre-selected content items can be automatically delivered responsive to a content request without having to evaluate content inventory.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

A request for content can be received from a user, where the request includes a user identifier identifying the user as being of or associated with a targeting group. For example, a cookie received with a request may identify the user as being associated with a user list that includes users having certain interests. One or more pre-selected content items eligible for delivery to the user can be identified, based on the user identifier, where the pre-selected content items have been previously pre-selected for delivery to users that are associated with the targeting group. One of the pre-selected content items can be selected to be served in response to the request for content, based at least in part on evaluation criteria. For example, the content item selected may be farther from achieving a delivery goal than other eligible, pre-selected content items. The selected content item can be provided to the user in response to the user's request for content.

Figure 1:
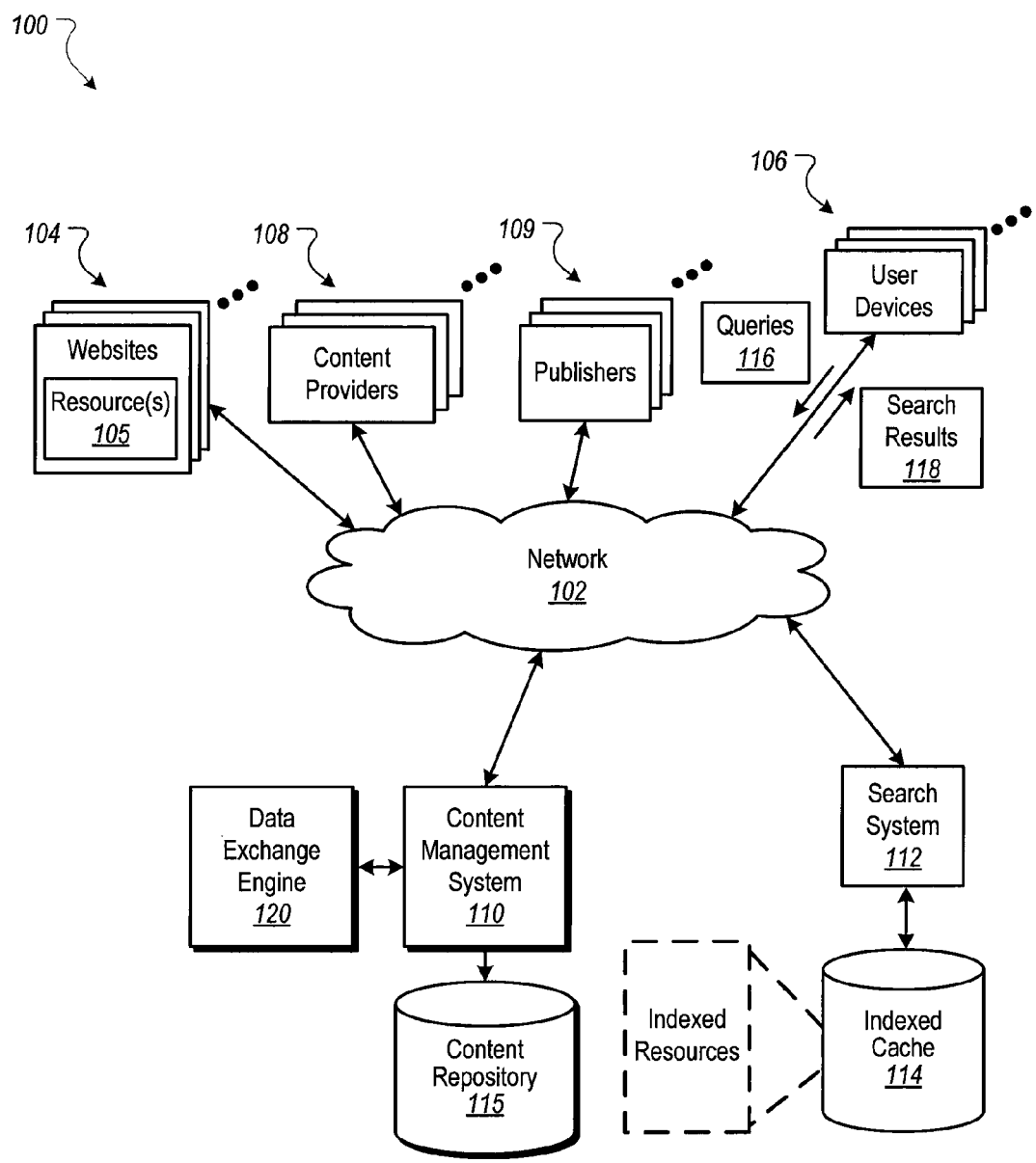
FIG. 1 is a block diagram of an example environment for providing pre-selected content to a user.

FIG. 1 is a block diagram of an example environment 100 for providing pre-selected content to a user. The example environment 100 includes a network 102 such as a local area network (LAN), wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109.

A website 104 includes one or more resources 105 associated with a domain name and hosted by one or more servers. An example website 104 is a collection of webpages formatted in hypertext markup language (HTML) that can contain text, images, multimedia content, and programming elements, e.g., scripts. Each website 104 is maintained by a publisher 109, e.g., an entity that controls, manages and/or owns the website 104.

A resource 105 is any data that can be provided over the network 102. A resource 105 is identified by a resource address that is associated with the resource 105. Resources 105 include HTML pages, word processing documents, and portable document format (PDF) documents, images, video, and feed sources, to name only a few examples. The resources 105 can include content, e.g., words, phrases, images and sounds that may include embedded information (such as meta-information in hyperlinks) and/or embedded instructions (such as JavaScript scripts).

To facilitate searching of resources 105, the environment 100 can include a search system 112 that identifies the resources 105 by crawling and indexing the resources 105 provided by the publishers 109 on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102 and the presentation of content to a user.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116. A request for a resource 105 or a search query 116 can also include an identifier, such as a cookie, identifying the user of the user device 106.

Based on data included in the request for content, the content management system 110 can select content items that are eligible to be provided in response to the request, such as content items having characteristics matching the characteristics of a slot. As another example, content items having targeting keywords that match the resource keywords or the search query 116 may be selected as eligible content items by the content management system 110. Content items may be selected, for example from a content repository 115. One or more selected content items can be provided to the user device 106 in association with providing an associated resource 105 or search results 118.

In some implementations, content to be provided in response to some or all requests for content may be pre-selected. For example, a set of users and associated user profiles may be identified, where a user profile describes features associated with the user that can be targeted to by content providers 108. For example, one or more user lists (described in more detail below) that a user is associated with may be identified, or historical usage information may be identified. Particular users may be identified in user lists or in usage information using, for example, a cookie.

The content management system 110 may determine, for each user, one or more available content items from the content repository 115 that completely or at least partially match the features associated with the user. For example, if a user is associated with a user list that identifies users who are sports fans, the content management system 110 may determine one or more content items, for the user, that relate to sports fans. The content management system 110 may rank the determined content items for the user, such as to indicate a strength of match between a content item and a user (e.g., as determined by evaluating a user's profile). The content management system 110 may store the ranked content items, in association with the user (e.g., in the content repository 115), forming a list of eligible, pre-selected content items for the user, such that when a subsequent request is received that identifies the user, one or more of the pre-selected content items can be automatically delivered in response to the request without having to evaluate available inventory or real time information associated with the user or the request.

Pre-selecting content items can result in faster processing time for responding to a request for content. Determining which content items are eligible to deliver to a particular user can involve evaluating complex targeting expressions that can include, for example, evaluating multiple Boolean combinations. Pre-selecting content items for a user before a request for content is received can result in a significant time reduction in processing a user request for content.

A pre-selected content item may match a particular user (e.g., as described in a user profile), but may or may not match a context of a given request. For example, a pre-selected content item that matches the user profile may or may not match a resource keyword associated with a requested resource 104 or a search query 116 or a context associated with the request (e.g., weekday mid-day targeting). In some implementations, the content management system 110 may, in response to a request for content, select content items from pre-selected content items that match the user and that do not match other targeting criteria (e.g., a context of the request) in order to, for example, speed or customize delivery to the user. Selecting from the pre-selected content items may result in faster processing as compared to the content management system searching the entire inventory of content items for content items that match a particular user and the context of a given request.

In some implementations, along with selecting content items from pre-selected content items, the content management system 110 can also select content items based at least in part on results of an auction. For example, for the eligible content items, the content management system 110 can receive bids from content providers 108 and allocate the slots, based at least in part on the received bids (e.g., based on the highest bidders at the conclusion of the auction).

Some content providers 108 prefer that the number of impressions allocated to their content and the price paid for the number of impressions be more predictable than the predictability provided by an auction. A content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Other targeting criteria can be specified including contextual targeting criteria. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 may desire that a content item be viewed by users matching a particular user profile. For example, a shoe manufacturer may desire to show advertisements for shoes on a sports page of a news web site provided by a publisher 109 to users who fit a particular targeting profile, such as male, ages eighteen to thirty five. Users matching this user profile may be available in or associated with one or more user lists.

User lists may be created, such as by content providers 108, publishers 109, or the content management system 110 collecting data, over time, about how specific content may or may not be meaningful to users. In some implementations, user lists can be shared with other entities, such as for example using a data exchange. A data exchange engine 120 can be configurable to maintain, update, present, license, sell or otherwise manage one or more user lists based on owned or permissioned data. User lists can be shared amongst content providers 108, third party service providers, data aggregators, and other online users.

User lists can indicate specific content that is of interest to one or more users, such as by representing specific user information pertaining to predefined categories. For example, a user list may include data about one or more users which characterizes the users to a category (e.g., homeowner, craftsman, movie renter, etc.) to allow targeting of the users by, for example, the publishers 109 or content providers 108. A user list can be associated with one or more predefined categories pertaining to specific users. An association can be made between user specific information and user lists. Categories can be defined by or relate to user information including, but not limited to browser history, user selections, cookie information, user provided preferences, purchase histories, web search data, or other data (i.e., where the user has provided permission for the storing and/or collecting of such data).

The content management system 110 can pre-select content that matches category information associated with a user list or with some other targeting group. For example, the content management system 110 can determine one or more available content items from inventory that at least partially match targeting criteria specified by a content provider. The matching may include comparing the targeting criteria to one or more categories associated with a user list or another targeting group. The content management system 110 can rank the pre-selected content items, such as according to how strongly each content item matches the targeting criteria specified. In some implementations, the ranked content items can be stored (e.g., in the content repository 115), in association with a user list or other targeting group, such that when a request is received that identifies the user list or other targeting group, one or more of the stored ranked content items can be selected and delivered in response to the request.

For example, the content management system 110 may receive a request for content that includes an identifier (e.g., a cookie) of a user, and the content management system 110 can determine that the user is a member of a particular targeting group, based on the received user identifier. The content management system 110 can identify one or more of the pre-selected content items that are eligible for delivery to the users that are associated with the targeting group, based on the received user identifier. The content management system 100 can determine, based at least in part on evaluation criteria, that one of the pre-selected content items should be served responsive to the request. For example, the evaluation criteria can include criteria based on a measure of urgency in needing to deliver a respective content item. For example, for each content item, a measure of how much ahead or how much behind the content item is in terms of meeting a delivery goal can be evaluated, and a content item having the highest urgency of delivery can be determined. The content management system 110 can provide the determined content item in response to the request for content.

In summary, the content management system 110 may select a content item from pre-selected content items in response to different types of requests for content. For example, the request for content may be to fill a slot included in a resource 105, where the content item is selected from among pre-selected content items that match features associated with the user and that also match (as determined when responding to the request) a context (e.g., resource keywords, time of day, or other specified criteria) associated with the resource 105. As another example, the request for content may be to fill a slot in a search results 118, where the content item is selected from among pre-selected content items that match features associated with the user and that also match the associated search query 116. As yet another example, the request for content may be received by a publisher 109 who has entered into agreements with one or more content providers 108, where the request is for a content item that matches a targeting group associated with the user and where providing the content item may advance the publisher's obligation to display a certain number of impressions for the content provider 108 associated with a selected content item. The content item may be selected from pre-selected content items, not based on a context of the publisher content, nor in response to a user search, but based on the user being identified with a targeting group for which eligible, matching content items have been pre-selected.

Figure 2:
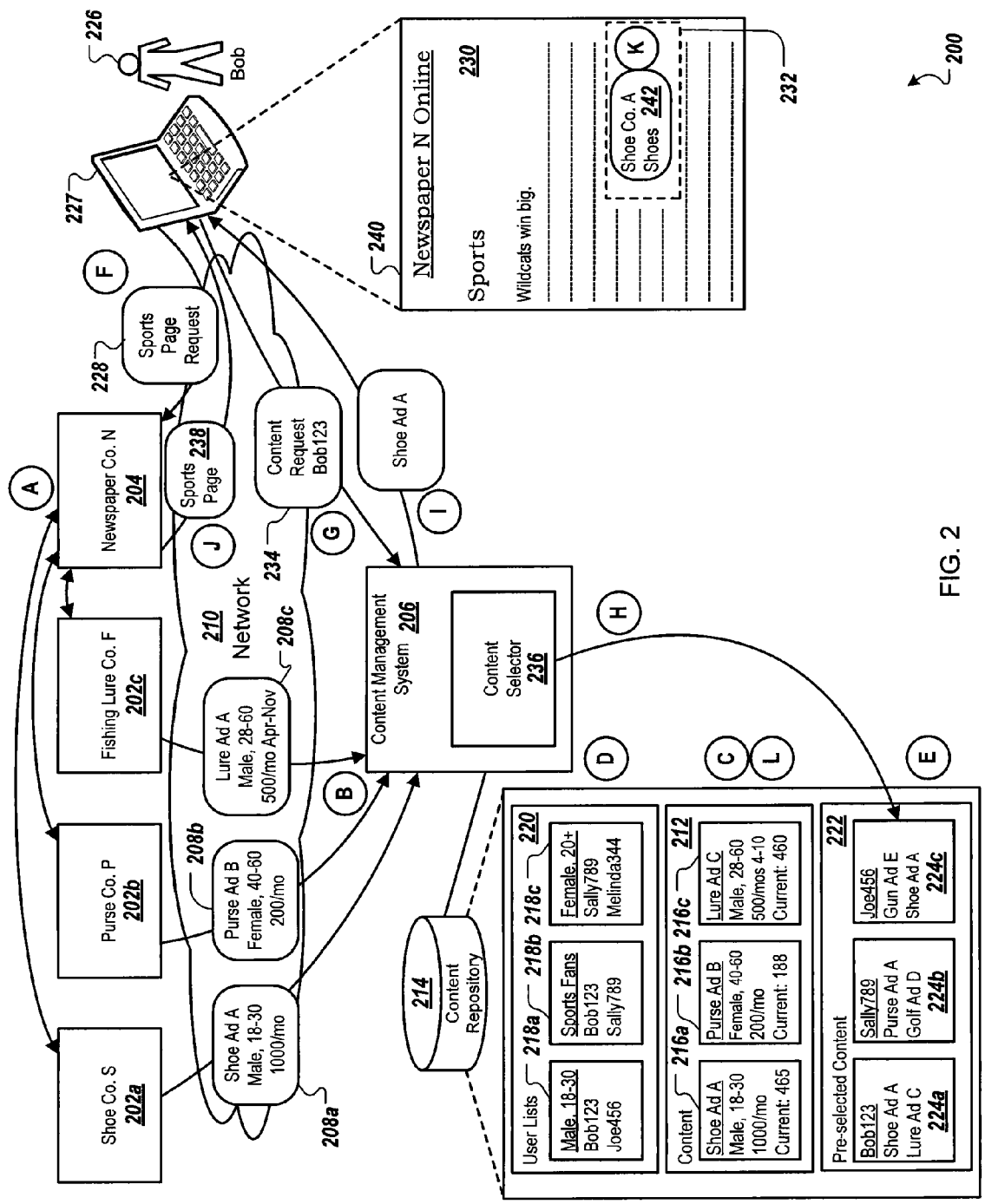
FIG. 2 illustrates a block diagram of an example system for providing pre-selected content to a user.

FIG. 2 illustrates a block diagram of an example system 200 for providing pre-selected content to a user. In a state "A", a shoe company content provider 202a, a purse company content provider 202b, and a fishing lure company content provider 202c each enter into an agreement with an online newspaper publisher 204. Each agreement requires that the publisher 204 allocate to a respective content provider 202a, 202b, or 202c, at least a specified number of content slot impressions over a specified period (e.g., one month) for each content item subject to a respective agreement. An agreement between a content provider 202a, 202b, or 202c and the publisher 204 can also specify that respective content items be shown to users having specified targeting characteristics (i.e., the targeting criteria or targeting information).

Content items, targeting information, delivery goals, and other information may be sent, in a state "B", to a content management system 206, to enable the content management system 206 to facilitate the agreements between the content providers 202a, 202b, and 202c and the publisher 204. For example, information 208a relating to an agreement between the content provider 202a and the publisher 204 specifies that a "shoe ad A" be targeted to male users aged eighteen to thirty and receive one thousand impressions per month. Information 208b relating to an agreement between the content provider 202b and the publisher 204 specifies that a "purse ad B" be targeted to female users aged forty to sixty and receive two hundred impressions per month. Information 208c relating to an agreement between the content provider 202c and the publisher 204 specifies that a "lure ad C" be targeted to male users aged twenty eight to sixty during the fishing season months of April to November and receive five hundred impressions per month during those months.

The information 208a, 208b, and 208c may be sent to the content management system 206 over a network 210, where the network 210 may be the Internet or some other public or private, wired or wireless network. The information 208a, 208b, and 208c may be sent to the content management system 206 by the content providers 202a, 202b, and 202c, respectively, or some or all of the information 208a, 208b, or 208c may be sent to the content management system 206 by the publisher 204.

In a state "C", the content management system 206 stores received content items, targeting information, and delivery goals in a content area 212 of a content repository 214. For example, the information 208a, 208b, and 208c may be stored in content areas 216a, 216b, and 216c, respectively. The content management system 206 may maintain, in the content areas 216a, 216b, and 216c, an impression count for each respective content item, which tracks how many times a respective content item has been presented during the current tracking period.

In a state "D", the content management system 206 maintains or obtains user lists 218a, 218b, and 218c and stores the user lists 218a, 218b, and 218a in a user list area 220 of the content repository 214 (or in some other repository). As described above, user lists such as the user lists 218a, 218b, and 218c can indicate specific characteristics of its users and necessarily content that may be of interest to one or more users, such as by representing specific user information pertaining to predefined categories. Categories may be identified and users may be assigned to one or more user lists based, for example, on evaluating user browser history, user selections, cookie information, user provided preferences, purchase histories, web search data, user demographics, or other data (i.e., where the user has provided permission for the storing and/or collecting of such data). The user list 218a, for example, indicates that a user "Bob" with identifier "Bob123" and a user "Joe" with identifier "Joe456" are each male, aged eighteen to thirty.

In a state "E", based on the user list information in the user list area 220 (and/or based on other information), the content management system 206 determines, for each user in each user list 218a, 218b, and 218c, one or more available content items from the content area 212 that at least partially match the respective users, and stores the determined content items in association with each user in a pre-selected content area 222. The pre-selected content items are stored such that when a request for content is received by the content management system 206 that identifies the user list 218a, 218b, or 218c (e.g., a request may include an identifier of a user associated with the user list 218a, 218b, or 218c), one or more of the stored content items can be selected and delivered in response to the received request. While reference is made to storing the items, in some implementations, a reference to a particular item is stored rather than the specific item.

A pre-selected content list 224a for the user "Bob" includes references to the "shoe ad A" and the "lure ad C", since "Bob" is a member of the user list 218a which includes male users aged eighteen to thirty, which matches targeting information included in the content area 216a and the content area 218a, for the "shoe ad A" and "lure ad C", respectively. A pre-selected content list 224c for the user "Joe" includes references to the "shoe ad A" and to a "gun ad E". A pre-selected content list 224b for a user "Sally" includes references to a "golf ad D" and to a "purse ad A" associated with the content area 216b. The content management system 206 may rank the content items in a particular pre-selected content list 224a, 224b, or 224c, such as in some implementations according to a relative strength of match between features of the user and targeting information associated with a respective content item.

In a state "F", the user "Bob" (shown as user 226) submits, using a user device 227, a request 228 to the publisher 204 for an online sports page produced by the publisher 204. As shown in sports page content 230, the requested sports page includes a content slot 232. In a state "G", the user device 227 (or the publisher 204) submits a request 234 to the content management system 206 to fill the content slot 232. The request 234 includes an identifier of the requesting user "Bob" (e.g., a cookie with a value of "Bob123").

In a state "H", a content selector 236 identifies the "shoe ad A" and the "lure ad C" included in the pre-selected content list 224a as content items eligible for delivery to the user "Bob" 226, based on matching the received user identifier to the user identifier "Bob123" associated with the pre-selected content list 224a. The content selector 236 can determine, based at least in part on an evaluation criteria, which one of the pre-selected content items in the pre-selected content list 224a should be served in response to the request 234. For example, the evaluation criteria can include criteria that are based on a measure of urgency in needing to deliver a respective content item, such as relating to how much ahead or behind a respective content item is in terms of a delivery schedule. For example, as shown in the content area 216a, the "shoe ad A" has received four hundred sixty five impressions in the current period towards a goal of one thousand impressions. As shown in the content area 216c, the "lure ad C" has received four hundred and sixty impressions towards a goal of five hundred impressions. In this example, the content selector 236 may select the "shoe ad A" in response to the request 234, since the "shoe ad A" is the furthest away from an associated delivery goal among the content items included in the pre-selected content list 224a.

In a state "I", the content management system 206 provides the selected content item (e.g., the "shoe ad A") to the user device 227. In a state "J", the publisher 204 provides a resource 238 representing the requested sports page to the user device 227. In a state "K", the sports page resource 238 is displayed as the sports page content 230 in a user interface 240 that is displayed on the user device 227. As shown in a content presentation 242, the "shoe ad A" is displayed in the content slot 232 that is included in the sports page content 230. In a state "L", the content management system 206 updates an impression count associated with the "shoe ad A" content item (e.g., a count of four hundred sixty five maintained in the content area 216a may be incremented to a new count of four hundred sixty six).

In the example of selecting the "shoe ad A" for presentation in the content slot 232, neither the context of the sports page content 230 nor the context of the request 234 (other than the requesting user) factored into the selection. For some requests, however, other context may be considered and some context may be considered at the time of content selection (e.g., in contrast to simply selecting a pre-selected content item). For example, the "lure ad C" has targeting information which specifies a delivery goal for certain months of the year (e.g., the content provider desires that the "lure ad C" be shown during fishing season months from April to November).

The content selector 236 can consider the current date when determining whether to select the "lure ad C" in response to a request. If the current date is not within the months of April to November, the content selector 236 might not select the "lure ad C", even if other criteria is met. In other words, for a requesting user, the "lure ad C" may partially match a request for content by the user, by its targeting information matching features of the user, but the "lure ad C" may not be selected if other context associated with the request (such as the current date) does not match criteria specified by the targeting information associated with the "lure ad C".

Figure 3:
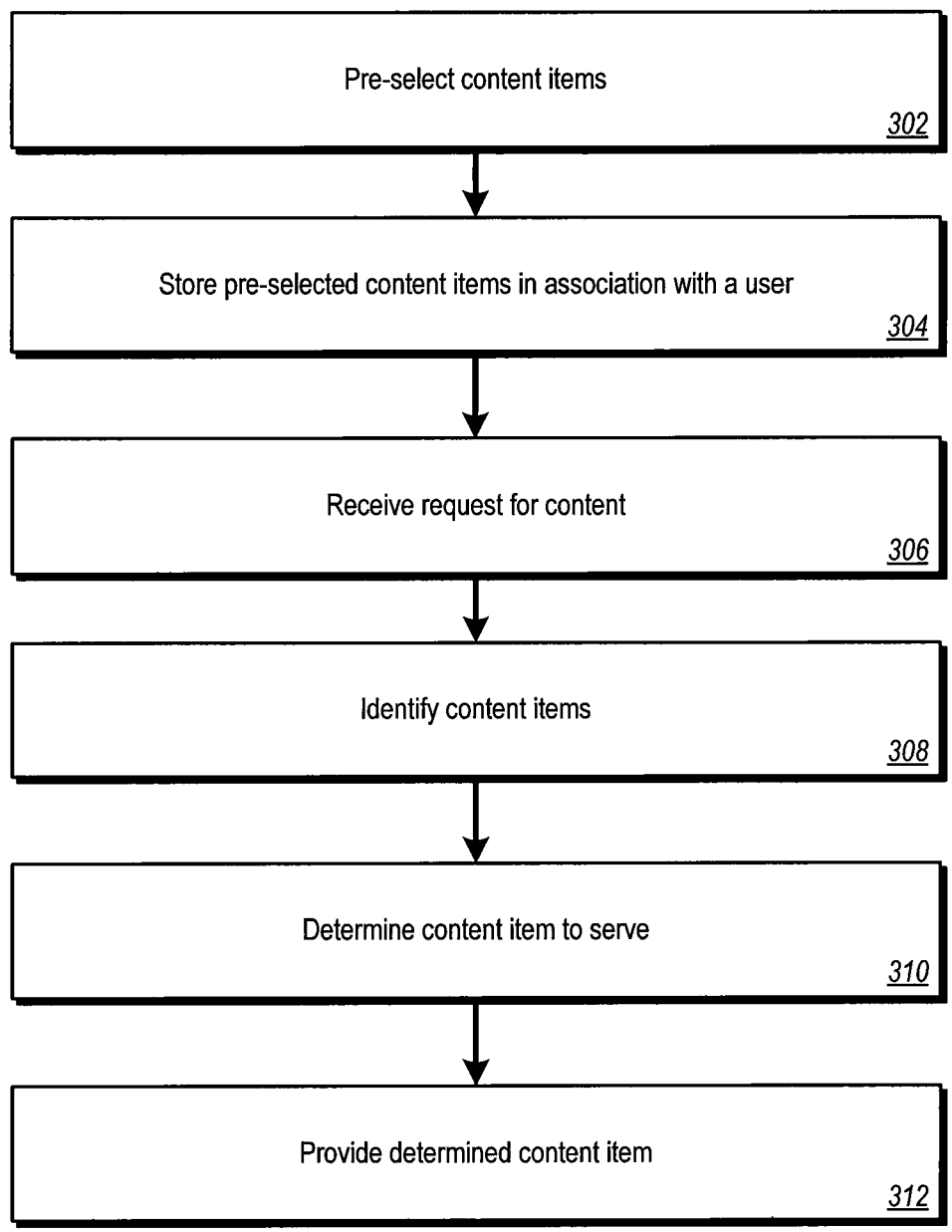
FIG. 3 is a flowchart of an example process for providing content in response to a request for content from a user who is associated with a targeting group.

FIG. 3 is a flowchart of an example process 300 for providing content in response to a request for content from a user who is associated with a targeting group. The process 300 can be performed, for example, by the content management system 110 described above with respect to FIG. 1.

One or more content items are pre-selected, by a server system, for delivery to a user (302). The server system can be, for example, the content management system 110. For example, the one or more content items may be pre-selected based at least in part on a user identifier. The user identifier, which can be, for example, a cookie, can identify the user as being associated with a targeting group and can indicate a user profile that is associated with the user. The user profile can describe features associated with the user that can be targeted to by content providers. The content items can be selected, for example, from content items that are in an inventory of content items (e.g., in one or more content repositories, such as the content repository 115) that are available for serving to users. Each pre-selected content item can include one or more targeting aspects that are to be satisfied before a respective pre-selected content item is served, and each of the one or more pre-selected content items can be content items that at least partially match one or more user features included in the user profile.

The pre-selected content items are stored in a list in a server system in association with the user (304). The list may be stored, for example, in a mapping database included in a content repository (e.g., the content repository 115) or in another repository. As another example, the mapping database can be included in the pre-selected content area 222 described above with respect to FIG. 2. The list may include, for example, an identifier for each pre-selected content item and may be associated with the user in the mapping database, for example, using a user identifier, such as a cookie.

A request for content is received, after the storing, at the server system, and from a client device (306), with the request including the identifier. The client device can be, for example, a particular user device 106. The identifier can be determined to be associated with a targeting group, such as a user list. For example, it can be determined that a cookie associated with the request is included in a particular user list. As another example, it may be determined that particular targeting information, such as a feature set that describes the user, is associated with the identifier.

The request for content can be, for example, a request for content to be published on a publisher property. In some implementations, the request can be associated, for example, with a slot included in publisher content that is not targeted based on context of the content but rather is targeted towards a particular group (e.g., male users in a particular age range). In some implementations, the request can be received, for example, not in response to a user search for particular content, but rather in response to a user loading a particular publisher page.

One or more of the pre-selected content items eligible for delivery to the user are identified, in the server system, based on the identifier (308). A particular set of one or more pre-selected content items can be identified, for example, by matching the identifier included in the request for content to an identifier included in the mapping database.

It is determined, in the server system, based at least in part on one or more evaluation criteria, that one of the pre-selected content items should be provided responsive to the request (310). The evaluation criteria can include, for example, criteria based on a measure of urgency in needing to deliver a respective content item. For example, for each content item, a measure of how much ahead or how much behind the content item is in terms of meeting a delivery goal can be evaluated, and a content item having the highest urgency of delivery can be determined.

As another example, for items that are pre-selected and that only partially match targeting criteria associated with the targeting group, the content management system 110 can determine, after the request is received, the extent that a given partially matching pre-selected content item matches the targeting criteria associated with the targeting group. The targeting criteria may include, for example, targeting criteria that is based on context associated with the request. The content management system 110 can determine whether or to what extent the context of the request matches the context-based targeting criteria.

For example, some targeting criteria may be based on time of day, time of year, location of request, or some other context information. As an example, targeting criteria for the targeting group can include targeting male users during evening hours. At the time of the request, each pre-selected content item that matches some or all the targeting criteria can be evaluated to determine whether or to what extent the respective pre-selected content item also matches context-related targeting criteria. For example, the time of the request can be compared to time-related targeting information, or a location associated with the request can be compared to location-related targeting information.

In some implementations, it may be determined to not serve a pre-selected content item, but to serve some other content item. For example, the content management system 110 may determine that no content items have been pre-selected for the targeting group. As another example, a pre-selected content item may partially match targeting criteria associated with the targeting group but a strength of match may be below an acceptance threshold. The content management system 110 can determine a content item that is not pre-selected that more strongly matches the targeting criteria.

The determined content item is provided, by the server system and responsive to the request, to the client device (312). For example, the determined content item can be sent to a user device 106, for presentation on the user device 106, such as in a slot included in publisher content.

Figure 4:
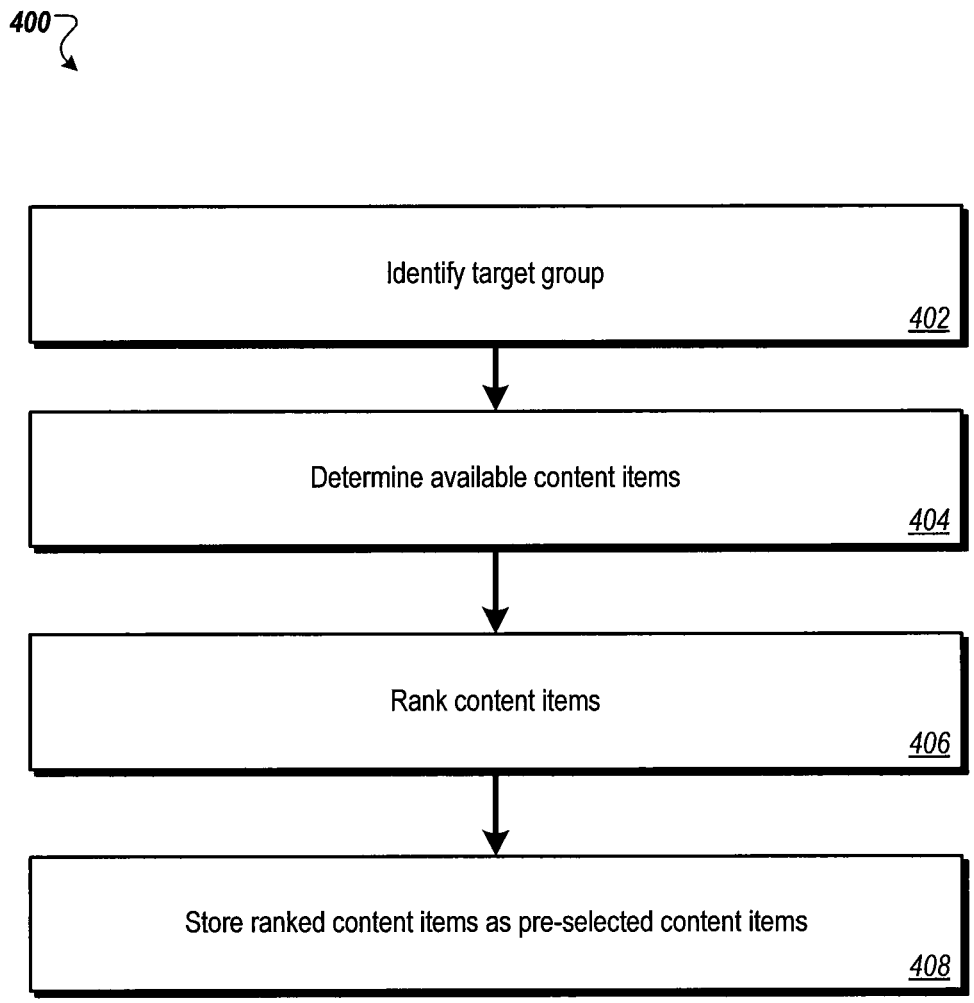
FIG. 4 is a flowchart of an example process for pre-selecting content items that are eligible to be delivered to a targeting group.

FIG. 4 is a flowchart of an example process 400 for pre-selecting content items that are eligible to be delivered to a targeting group. The process 400 can be performed, for example, by the content management system 110 described above with respect to FIG. 1. The process 400 can be performed by the content management system 110 before the content management system 110 first performs the process 300 described above for providing content in response to a request for content from a user who is associated with a targeting group. The content management system 110 may also perform the process 400 on an ongoing basis to maintain an inventory of pre-selected content items that are eligible to be delivered to a targeting group.

A targeting group is identified (402), the targeting group defining a set of characteristics for a target delivery of an impression. The targeting group can, for example, be associated with a plurality of user identifiers. Example user identifiers can include a cookie. The targeting group can be associated with a user list. The user list can define a category to which users included in the user list belong, where the category describes characteristics that can be used for targeting delivery of an impression.

One or more available content items are determined from inventory items that at least partially match the targeting group (404). The available content items can be determined, for example, from content items that are in an inventory of content items (e.g., in one or more content repositories) that are available for serving to users. Each available content item can include one or more targeting aspects that are to be satisfied before a respective pre-selected content item is served, and each of the one or more determined content items can be content items that at least partially match (e.g., based on the targeting aspects) the targeting group. For example, a content item can include targeting information that matches targeting information associated with one or more user identifiers or with a user list.

The determined content items are ranked (406). For example, the determined content items may be ranked according to how strongly each content item matches the characteristics of a user list or other targeting group. The ranked content items are stored in association with the targeting group (408), forming a list of eligible pre-selected content items for the targeting group, such that when a request is received that identifies the targeting group, one or more of the pre-selected content items can be automatically delivered responsive to the request without having to evaluate the inventory. The content items can be stored, for example, in a content repository (e.g., the content repository 115).

Figure 5:
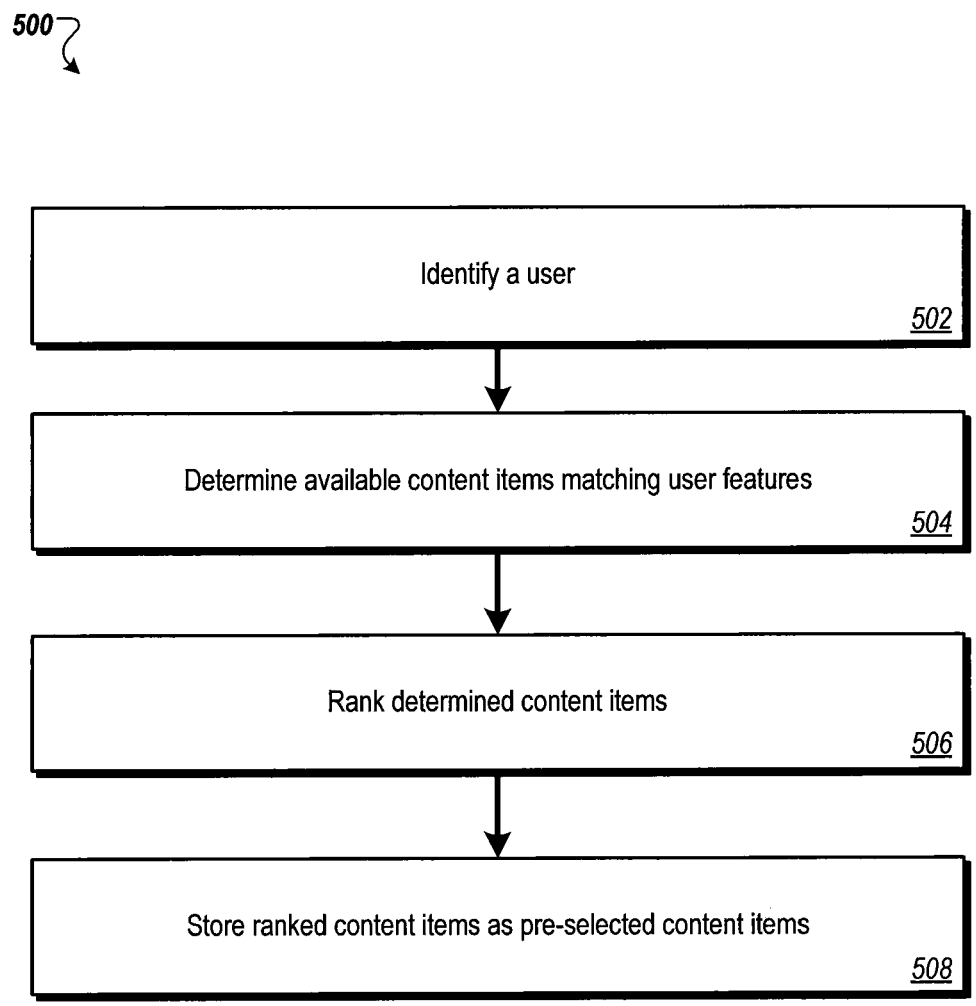
FIG. 5 is a flowchart of an example process for pre-selecting content items that at least partially match features of a user.

FIG. 5 is a flowchart of an example process 500 for pre-selecting content items that at least partially match features of a user. The process 500 can be performed, for example, by the content management system 110 described above with respect to FIG. 1.

A user is identified (502), the user including a profile that describes features associated with the user that can be targeted to by content providers. The user can be identified, for example, by a user identifier, such as a cookie. A user profile associated with the user identifier can be accessed. As another example, the user can be associated with one or more user lists. Each user list associated with the user can define one or more categories to which the user belongs, where each category describes features of the user. The identified user can be a user for which pre-selection of content has not been performed or has not been performed recently (e.g., users for which pre-selection of content has been performed recently may not be identified).

One or more available content items are determined from inventory that at least partially match the features associated with the user (504). The available content items can be determined, for example, from content items that are in an inventory of content items (e.g., in one or more content repositories, such as the content repository 115) that are available for serving to users. Each available content item can include targeting criteria that are to be satisfied before a respective pre-selected content item is served, and each of the one or more determined content items can be content items that at least partially match one or more features associated with the user.

The determined content items are ranked (506). For example, the determined content items may be ranked according to how strongly each content item matches features of the user. The ranked content items are stored in association with the user (508), forming a list of eligible pre-selected content items for the user, such that when a subsequent request is received that identifies the user, one or more of the pre-selected content items can be automatically delivered responsive to the request without having to evaluate available inventory. The content items can be stored, for example, in a content repository (e.g., the content repository 115).

Figure 6:
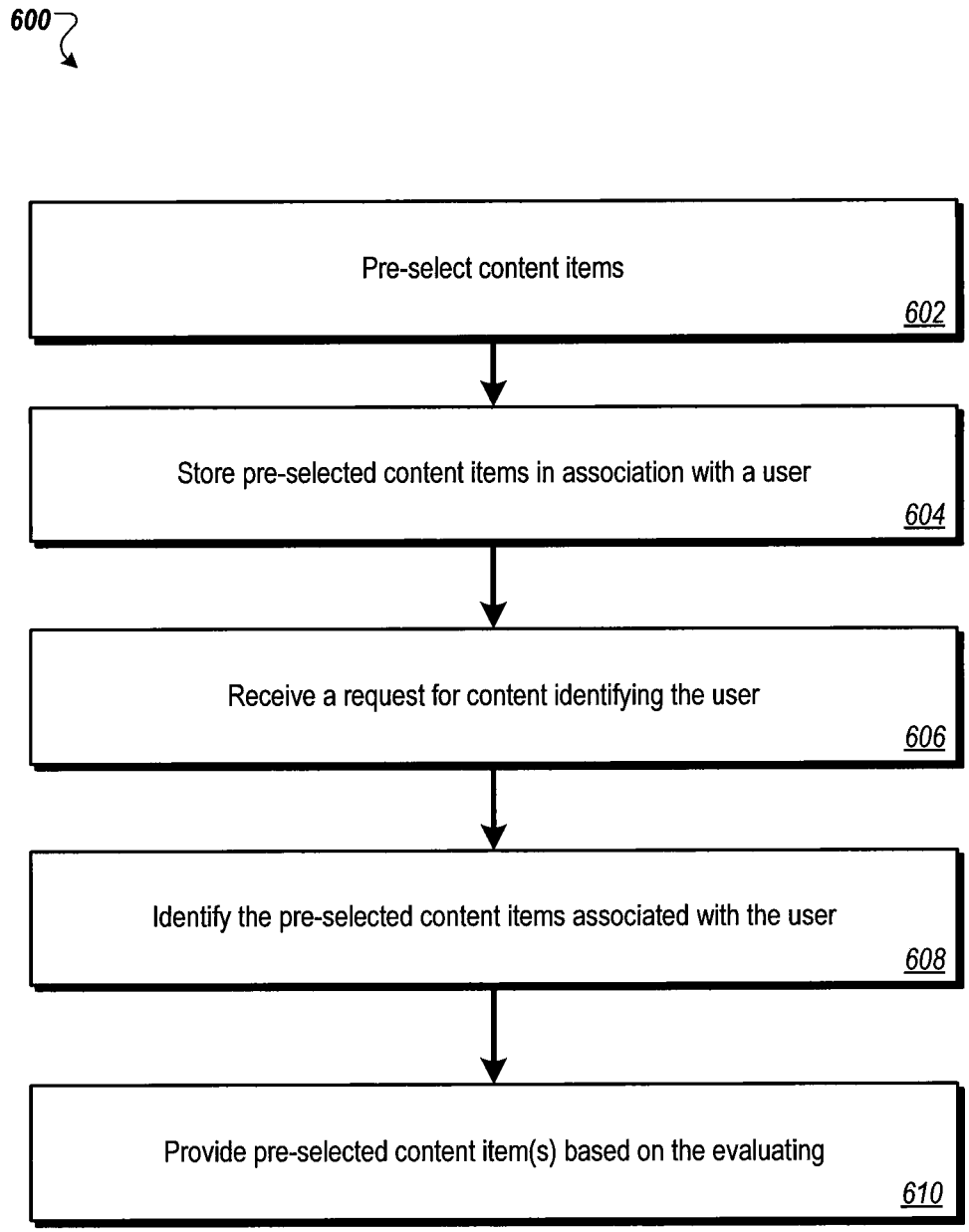
FIG. 6 is a flowchart of an example process for pre-selecting content for delivery to a user.

FIG. 6 is a flowchart of an example process 600 for pre-selecting content for delivery to a user and providing at least one pre-selected content item in response to a request for content that identifies the user. The process 600 can be performed, for example, by the content management system 110 described above with respect to FIG. 1.

One or more content items are pre-selected for delivery to a user (e.g., based at least in part on a user profile) (602). The user profile can describe features associated with the user that can be targeted to by content providers. The content items can be selected, for example, from content items that are in an inventory of content items (e.g., in one or more content repositories, such as the content repository 115) that are available for serving to users. Each pre-selected content item can include one or more targeting aspects that are to be satisfied before a respective pre-selected content item is served, and each of the one or more pre-selected content items can be content items that at least partially match one or more user features included in the user profile.

The pre-selected content items are stored at a server, in a list in association with the user (604). The list may be stored, for example, in a mapping database included in a content repository (e.g., the content repository 115) or in another repository. The list may include, for example, an identifier for each pre-selected content item and may be associated with the user in the mapping database, for example, using a user identifier, such as a cookie.

After the storing, a request for content is received (606), where the request for content identifies the user. The request may identify the user, for example, by way of a user identifier (e.g., a cookie) or by way of a user list. For example, it can be determined that a user identifier associated with the request is included in a particular user list. The request for content can be, for example, a request for content to be published on a publisher property. As another example, the request for content can be associated with a search query. The request can include a request to fill content in a content slot, such as a content slot on a publisher page or a content slot included in a search results page.

The pre-selected content items associated with the user are identified, responsive to the received request (608). The pre-selected content items can be identified by matching the identifier included in the request for content to an identifier included in the mapping database.

At least one of the pre-selected content items is provided responsive to the request based at least in part on the evaluating (610). For example, a content item having the highest urgency of delivery can be provided. As another example, a content item having a highest auction score can be provided. For example, the pre-selected content items can be evaluated based on one or more criteria. The criteria can include, for example, criteria based on a measure of urgency in needing to deliver a respective content item. For example, for each content item, a measure of how much ahead or how much behind the content item is in terms of meeting a delivery goal can be evaluated. As another example, if the request is associated with a search query, the criteria can include other signals, such as an auction score.

Figure 7:
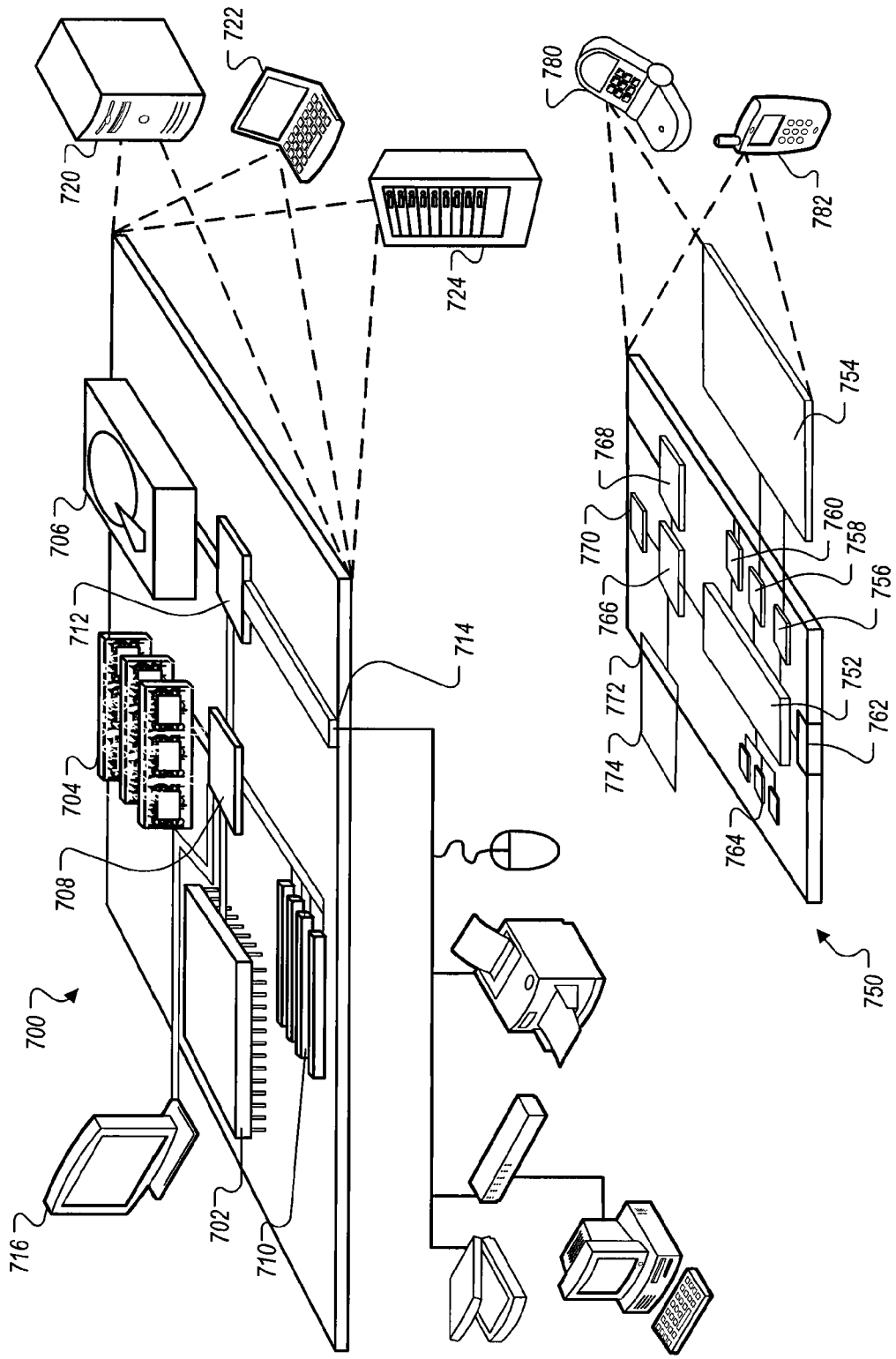
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is embodied in a tangible information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device, such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   pre-selecting, by a server system, one or more content items for delivery to a user based at least in part on a user identifier, the user identifier identifying the user as being associated with a targeting group, wherein the targeting group includes a plurality of users assigned to the group based on specific user information pertaining to pre-defined categories, and wherein the one or more pre-selected content items are selected according to the degree in which particular content items match characteristics of the targeting group;

storing the pre-selected content items in a list in a server system in association with the user;

receiving, after the storing, at the server system, and from a client device, a request for one or more content items, the request including the identifier;

identifying, in the server system, one or more of the pre-selected content items eligible for delivery to the user based on the identifier;

determining, in the server system, based at least in part on evaluation criteria, that one of the pre-selected content items should be provided to the user responsive to the request; and providing, by the server system and responsive to the request, the determined pre-selected content item to the client device for presentation along with one or more resources responsive to a user request.

2. The method of claim 1 where receiving the request for content includes receiving a request for content to be published on a publisher property.

3. The method of claim 1 where the request is associated with a slot that is not targeted based on context.

4. The method of claim 1 where the request is not a request responsive to a search.

5. The method of claim 1 where the one or more pre-selected content items are content items that are in an inventory of content items that are available for serving to users.

6. The method of claim 1 where, for items that are pre-selected and that only partially match the characteristics of the targeting group, the determining includes determining after the request is received whether a given partially matching pre-selected content item matches the characteristics of the targeting group.

7. The method of claim 1 where each content item includes one or more targeting aspects that are to be satisfied before serving a respective content item, and where the one or more pre-selected content items are content items having targeting aspects that at least partially match the characteristics of the targeting group.

8. The method of claim 1 where the evaluation criteria include criteria based on a measure of in needing to deliver a respective content item.

9. The method of claim 1 where the evaluation criteria include criteria based on a measure of how much ahead or behind a respective content item is in terms of a delivery schedule.

10. The method of claim 1 further comprising, prior to receiving the request:

identifying a targeting group including targeting characteristics of the targeting group;

determining one or more available content items from inventory that at least partially match the targeting characteristics of the targeting group;

ranking the determined content items; and storing the ranked content items in association with the targeting group, such that when a request is received that identifies the targeting group, one or more of the stored ranked content items can be delivered responsive to the request.

11. The method of claim 1, wherein the determining based at least in part on evaluation criteria includes evaluating the pre-selected content items based on a measure of urgency of delivery and selecting a particular pre-selected content item having the highest urgency of delivery as the pre-selected content item that should be provided to the user.

12. The method of claim 1, wherein the pre-selected content items are ranked based at least in part on a measure of urgency of delivery for each pre-selected content item.

13. A method comprising:

pre-selecting, by a server system, one or more content items for delivery to a user based at least in part on a user profile, wherein the user profile describes features associated with the user that can be targeted to by content providers and wherein the one or more content items are pre-selected based on a degree of match between the content items and the features associated with the user;

storing, at a server, the pre-selected content items in a list in association with the user;

after the storing, receiving a request for one or more content items, the request for content identifying the user;

identifying the pre-selected content items associated with the user responsive to the received request; and providing at least one of the pre-selected content items responsive to the request based at least in part on the evaluating.

14. A system comprising:

an identification engine that identifies one or more pre-selected content items eligible for delivery to a user based on a user identifier;

a storage medium that stores a list of the identified pre-selected content items associated with the user;

an evaluation engine that is configured to determine, based at least in part on an evaluation criteria, a pre-selected content item to be served in response to a request for one or more content items received from the user and after the storage of the list; and a content management system that receives a request for content including the user identifier identifying the user as being of or associated with a targeting group and provides a content item from the list determined by the evaluation engine in response to the request, wherein the targeting group includes a plurality of users assigned to the group based on specific user information pertaining to predefined categories, and wherein the one or more pre-selected content items are selected according to the degree in which particular content items match characteristics of the targeting group.

15. A computer program product embodied in a tangible medium that when executed by a processor causes the processor to:

receive a request for one or more content items, the request including an identifier identifying the user as being of or associated with a targeting group;

identify one or more pre-selected content items eligible for delivery to the user based on the identifier, the pre-selected content items being pre-selected for delivery to users that are associated with the targeting group, the list being created prior to receipt of the received request, wherein the targeting group includes a plurality of users assigned to the group based on specific user information pertaining to predefined categories, and wherein the one or more pre-selected content items are selected according to the degree in which particular content items match characteristics of the targeting group;

determine, based at least in part on an evaluation criteria, that one of the pre-selected content items should be served responsive to the request; and provide the determined pre-selected content item responsive to the request for presentation along with one or more resources responsive to a user request.

* * * * *

UNITED STATES PATENT AND TRADEMARK OFFICE
CERTIFICATE OF CORRECTION

PATENT NO. : 8,762,496 B1  
APPLICATION NO. : 13/186162  
DATED : June 24, 2014  
INVENTOR(S) : Raimondas Kiveris Page 1 of 1

It is certified that error appears in the above-identified patent and that said Letters Patent is hereby corrected as shown below:

In the Claims

In Claim 8, column 19, line 41, after "of" insert -- urgency --.

Signed and Sealed this  
Second Day of September, 2014

Michelle K. Lee  
*Deputy Director of the United States Patent and Trademark Office*